Figure 1:
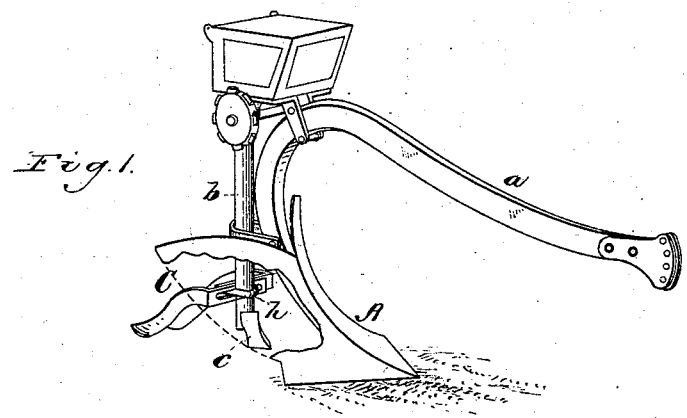

(No Model.)

T. PATES.
PLANTING PLOW.

No. 324,480. Patented Aug. 18, 1885.

Witnesses.
Henry Faukfurter.
Sam'l B. Dover.

Inventor.
Thomas Pates.
By. John Lauer
his Attorney.

UNITED STATES PATENT OFFICE.

THOMAS PATES, OF ALTON, ILLINOIS, ASSIGNOR TO THE HAPGOOD PLOW COMPANY, OF SAME PLACE.

PLANTING-PLOW.

SPECIFICATION forming part of Letters Patent No. 324,480, dated August 18, 1885.

Application filed August 12, 1884. (No model.)

*To all whom it may concern:*

Be it known that I, THOMAS PATES, a citizen of the United States, residing at Alton, in the county of Madison and State of Illinois, have invented a new and useful Improvement in Planting-Plows, of which the following is a specification.

My invention relates to planting-plows provided with a listing-plow in advance to open a wide furrow, a drill provided with a tooth or shovel to open a slit along the center of the furrow, followed by covering-blades adapted to cover the said slit with loose soil from the bottom of the furrow.

The invention will first be described in the specification, and afterward pointed out in the claim.

Referring to the drawings, like letters refer to like parts in all the figures, in which—

Figure 2:
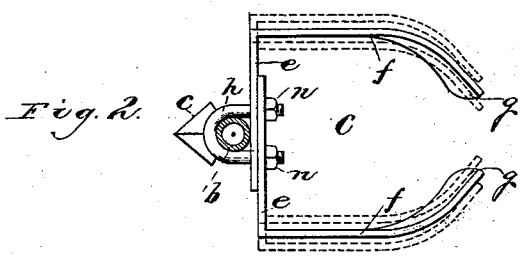
Figure 3:
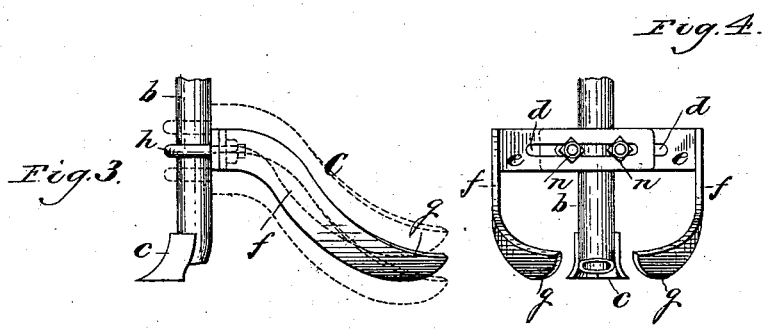
Figure 4:
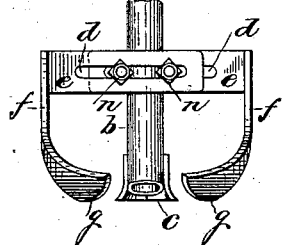

Figure 1 is a perspective view of my improved planting-plow, showing my improved covering-blades C connected therewith. Fig. 2 is a sectional plan view enlarged, showing my improved covering-blades C, the drill-pipe $b$, with shovel $c$, and the U-bolt $h$, attaching the covering-blades to the drill-pipe, the view taken on dotted line 2 in Fig. 1. Fig. 3 is a side elevation of same, and Fig. 4 a rear elevation of same.

The listing-plow A may be provided with a bent beam, $a$, having thereto attached a drill-pipe, $b$, provided with a shovel, $c$, at its bottom end to open a slit along the furrow, as ordinary and well-known, and shown in Fig. 1.

The drill-pipe $b$ is a cylindrical tube, preferably a piece of gas-pipe, shod with the shovel $c$ and attached to the rear of the plow in any ordinary manner, as shown.

C represents the covering-blades, of improved construction, consisting of two thin bars of steel bent and formed as shown in the drawings, the front ends, $e\ e$, of said bars bent inward, passing and overlapping each other, and provided with long slots $d\ d$, also overlapping each other, the sides $f\ f$ bent rearward, extending downwardly, and their rear ends curved inward, as shown in the drawings.

In operation, an ordinary U-bolt, $h$, connects said covering-blades C to the said drill-pipe $b$, as shown in the drawings, in which the U-bolt embraces the said pipe with its closed end, its open end extending through the said long slots $d$, with nuts $n$ on the legs of the U-bolt, as shown. By loosening the nuts $n$ the said blades C may be quickly adjusted up and down, sliding upon the pipe $b$, and at same time said blades may be adjusted wider apart or nearer together by sliding the overlapping ends $e\ e$ in or out, and by again tightening said nuts said blades may be set secure in any desired position.

It will be observed that by the construction of said blades with overlapping ends and connected to the drill-pipe with the U-bolt a wide range of adjustability is provided for, and thereby better adapted to meet the needs of the operator than heretofore.

Having thus set forth my invention, I claim—

In a planting-plow, the covering-blades C, consisting of thin steel, having their front ends bent inwardly, and provided with long slotted holes $d$, adapted to receive both legs of the U-bolt $h$, the sides of said blades bent rearwardly and downwardly and curved inwardly, as shown, in combination with the U-bolt $h$ and pipe $b$, all constructed, arranged, and adapted to operate substantially as and for the purpose set forth.

THOMAS PATES.

Witnesses:
CHAS. S. PHILIPS,
WM. R. PINCKARD.